(12) United States Patent
Luh

(10) Patent No.: US 6,599,207 B1
(45) Date of Patent: Jul. 29, 2003

(54) SYSTEM FOR HYDRAULICALLY ADJUSTING THE TRANSMISSION OF A CVT

(75) Inventor: Joachim Luh, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/763,956

(22) PCT Filed: Jun. 23, 2000

(86) PCT No.: PCT/DE00/02063

§ 371 (c)(1),
(2), (4) Date: Feb. 28, 2001

(87) PCT Pub. No.: WO01/02754

PCT Pub. Date: Jan. 11, 2001

(30) Foreign Application Priority Data

Jun. 30, 1999 (DE) .......................... 199 29 869

(51) Int. Cl.⁷ .......................... F16H 59/06; F16H 61/04
(52) U.S. Cl. .......................................... 474/28
(58) Field of Search .............................. 474/28, 18, 22; 477/44, 48, 49, 42

(56) References Cited

U.S. PATENT DOCUMENTS

| | | | | |
|---|---|---|---|---|
| 4,982,822 A | * | 1/1991 | Petzold et al. | 474/28 |
| 5,042,323 A | * | 8/1991 | Murano et al. | 477/49 |
| 5,157,992 A | * | 10/1992 | Hayashi et al. | 474/28 |
| 5,314,385 A | * | 5/1994 | Haley et al. | 474/28 |
| 5,334,102 A | * | 8/1994 | Sato | 474/18 |
| 5,447,029 A | * | 9/1995 | Swick et al. | 60/492 |
| 5,575,735 A | * | 11/1996 | Coutant et al. | 477/68 |

FOREIGN PATENT DOCUMENTS

| | | |
|---|---|---|
| DE | 196 49 483 | 6/1998 |
| DE | 197 33 960 | 2/1999 |
| EP | 0 451 887 | 10/1991 |
| JP | 07 259939 A | * 10/1995 |

* cited by examiner

Primary Examiner—Marcus Charles
(74) Attorney, Agent, or Firm—Walter Ottesen

(57) ABSTRACT

A system hydraulically adjusts the transmission ratio of a continuously variable transmission in a motor vehicle. The adjustment of the transmission ratio takes place by the drive of at least one valve via an electrical signal. Furthermore, in one operating state of the transmission, the transmission ratio is held essentially constant in that the electrical signal is set to a pregivable value. The valve then assumes the above-mentioned center position (blocking position). This operating state is also characterized as the ratio-hold state. The pregivable value can be changed in the normal operation of the vehicle. Component tolerances are compensated during operation of the vehicle or the transmission.

12 Claims, 5 Drawing Sheets

SYSTEM FOR HYDRAULICALLY ADJUSTING THE TRANSMISSION OF A CVT

FIELD OF THE INVENTION

The invention proceeds from a system for hydraulically adjusting the transmission ratio of a continuously variable transmission in a motor vehicle.

BACKGROUND OF THE INVENTION

Continuously variable vehicle transmissions are, for example, known from DE 196 49 483 A or U.S. Pat. Nos. 5,337,628 and 5,431,602. As will be explained in detail in the following, the adjustment of the transmission ratio takes place hydraulically via the adjustment of a so-called primary valve. To adjust the transmission ratio, an electric current is applied to the primary valve which, for example, can be configured as a magnetic valve and, in this way, a specific hydraulic oil pressure at the transmission is adjusted. Such a valve, in general, has several switching stages which can be adjusted by the precise dimensioning of the drive current. A position of the valve, in general the center position, serves for the purpose of permitting no hydraulic oil through the valve (block position).

In the control of the valve, it is very important that the dimensioning of the drive current during vehicle operation can take place with good accuracy essentially independent of tolerances of the components of the valve and/or independent of the deterioration of the components of the valve.

SUMMARY OF THE INVENTION

The task of the present invention is to achieve a very precise dimensioning of this drive current in normal operation of the vehicle.

As already mentioned, the invention proceeds from a system to hydraulically adjust the transmission ratio of a continuously variable transmission in a motor vehicle. The adjustment of the transmission ratio takes place via the drive of at least one valve by an electrical signal. Furthermore, the transmission ratio is maintained essentially constant in one operating state in that the electrical signal is set to a pregivable value. For example, the valve then assumes the above-mentioned center position (block position). This operating state is also characterized as a ratio-hold state.

The essence of the invention is that the pregivable value can be changed in normal operation of the vehicle. The invention affords the advantage that component tolerances are compensated in the continuous operation of the vehicle or of the transmission. In this way, the adjustment complexity during the assembly of the vehicle is reduced. In addition, with the invention, the deterioration of components and especially the change of the spring in the valve (for example, setting of the spring) is compensated during the operation.

According to the invention, it is especially provided that the change of the pregivable value takes place in dependence upon an adaptation and the adaptation is carried out in the presence of pregivable operating conditions. According to the invention, the valve current, which is intended to lead to an adjustment of the center position of the valve, is adapted to the instantaneously present conditions (for example, deterioration, tolerances) during operation.

Furthermore, it can be provided that the pregivable value comprises a (fixed) base value and an offset value. The offset value is then changed or adapted in accordance with the invention. Here, it is especially provided that the offset value is applied not only to adjust the above-mentioned center position of the valve but is considered also generally in the formation of the electrical signal.

In a first variation of the invention, the pregivable value, especially the offset value, is changed when a change of the transmission ratio is detected for the presence of the pregivable operating conditions (ratio-hold state).

In this connection, it is especially provided that at least one of the pregivable operating conditions is present when the transmission is in an operating state wherein the transmission ratio is held constant especially by setting the electrical signal to the pregivable value (ratio-hold state). In the special case of the already described valve, this means that the valve is driven to adjust the center position (block position) whereupon the transmission ratio should ideally not change or should change only to a slight extent. If the transmission ratio, however, changes significantly, then an adaptation of the drive current is required. It is especially provided that the pregivable value, especially the offset value, is changed in such a manner that the change of the transmission ratio is countered.

In addition to the operating condition mentioned in the last section, other ones of the pregivable operating conditions can then be present:

when quasi steady-state operating conditions of the transmission are present and it is especially provided that quasi steady-state operating conditions are present when the vehicle longitudinal speed (especially the output rpm of the transmission) does not change significantly as a function of time; and/or, when the vehicle longitudinal speed, especially the output rpm or the input rpm of the transmission is within a pregivable range; and/or, when the temperature of the transmission is within a pregivable range; and/or, when the transmission ratio is within a pregivable range.

In a second variation of the invention, it is provided that at least one of the pregivable operating conditions is present when the transmission is in an operating state in which the transmission ratio is essentially constant or does not significantly change as a function of time.

While the first variation undertakes the adaptation during the operating state of the transmission wherein the electrical signal is set to a pregivable value, the second variation proceeds from an operating state wherein the transmission ratio is controlled to be constant. If one first does not consider the minimum and maximum transmission ratios, then the valve must be in its center position when the constant transmission ratio is present. This can be used for adaptation in that the pregivable value, especially the offset value, is changed in dependence upon the electrical signal which is adjusted in the presence of the pregivable operating conditions.

In addition to the operating condition mentioned in the last section, other ones of the pregivable operating conditions can be present:

when the transmission ratio is within a pregivable range; and/or, when the time-dependent change of the transmission ratio of the transmission is within a pregivable range; and/or, when quasi steady-state operating conditions of the transmission are present and it is especially provided that quasi steady-state operating states are present when the vehicle longitudinal speed (especially the output rpm of the transmission) does not significantly change as a function of time; and/or, when the temperature of the transmission is within a pregivable range.

A third variation of the invention provides that a pressure is controlled via the drive of the valve and a pressure value is detected which represents the pressure in the ratio-hold operating state of the transmission. The pregivable value can then be changed in dependence upon the detected pressure value.

The idea of the third variation of the invention proceeds from the fact that a pressure sensor is present for detecting the pressure controlled by the valve or this pressure can be computed from other quantities. The center position of the valve is so adjusted or adapted that a specific pressure adjusts.

Furthermore, it can be provided that the electrical signal, that is the current value, is adjusted during adaptation in such a manner that the adjustment of the transmission ratio to higher transmission ratios is undertaken, that is, the CVT is therefore shifted up. Here, the electrical signal adjusted during the adaptation can be less than the electrical signal adjusted before the adaptation by a difference value. That means that the current, which is adjusted during the adaptation, is equal to the ratio-hold current value less a difference value; that is, the current during the adaptation is somewhat less than the ratio-hold current.

BRIEF DESCRIPTION OF THE DRAWINGS

The invention will now be described with reference to the drawings wherein:

FIG. 1 shows an overview diagram of a continuously adjustable transmission; whereas.

DESCRIPTION OF THE PREFERRED EMBODIMENTS OF THE INVENTION

Figure 1:
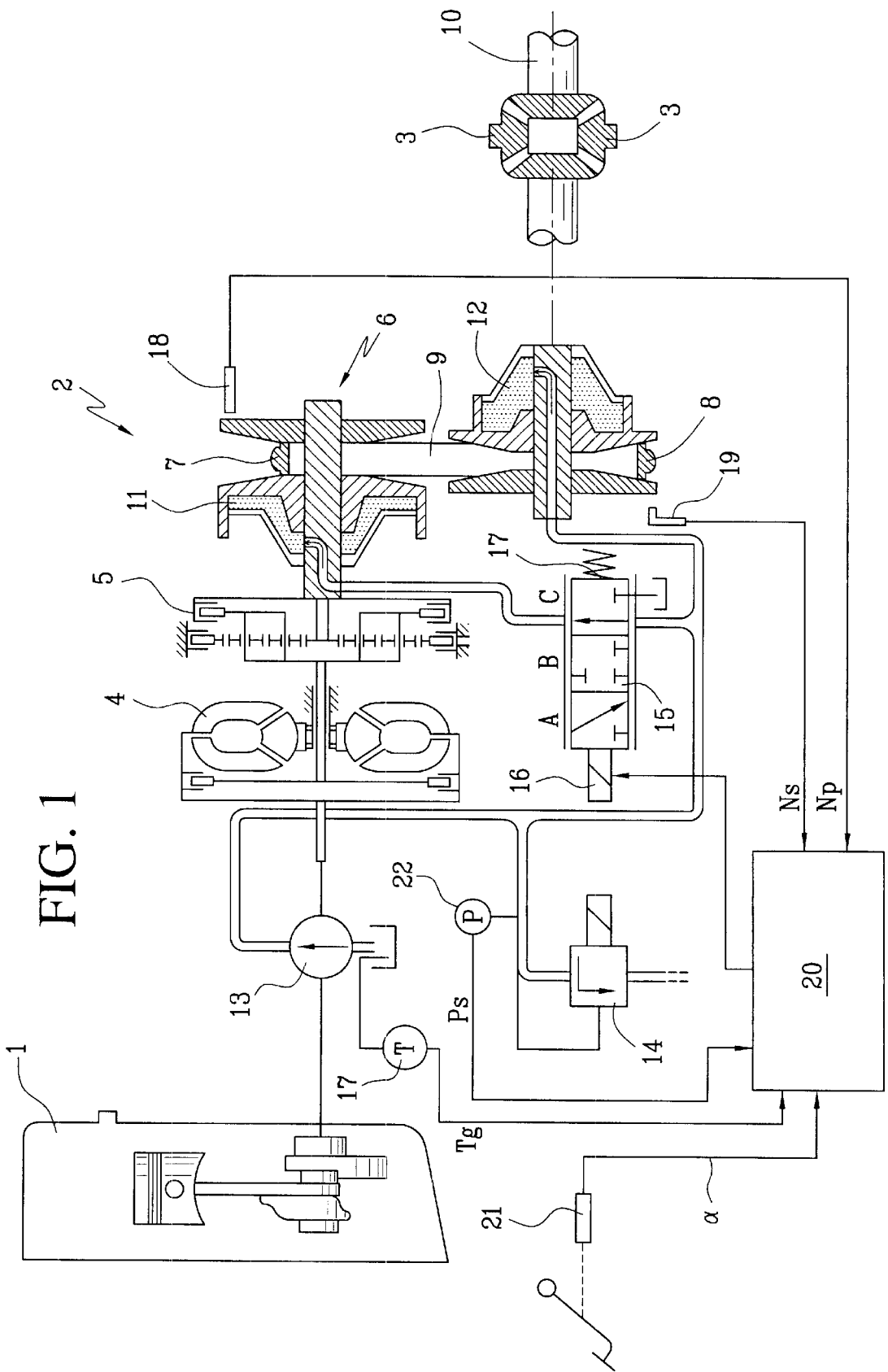

The invention will be described in greater detail in the following with respect to an embodiment. In FIG. 1, a continuously variable belt transmission in motor vehicles is identified by reference numeral 2 and is for the purpose of transmitting force from engine 1 to the drive shafts 3 of the wheels. Such a continuously variable transmission has, for example, a torque converter 4 and clutches 5 for forward and rearward shifting which are mounted between the engine 1 and the variator 6. The variator 6 comprises a drive end conical disc set 7 (primary) and an output end conical pulley set 8 (secondary). The force is transmitted from the drive disc set 7 to the output disc set 8 with the aid of a chain or a thrust belt 9. Each conical pulley set comprises an axially fixed pulley and an axially movable pulley. The transmission ratio of the variator 6 changes from a high start drive ratio "low" to a low transmission ratio "overdrive" by simultaneously varying the axially movable pulleys on the drive pulley set and the output pulley set.

The output pulley set is connected via a compensating transmission 10 to the drive shafts 3 of the wheels. The axially movable conical pulleys 7 and 8 are hydraulically adjustable and have oil chambers 11 and 12 for this purpose.

The transmission has an oil pump 13 for supplying pressurized oil and this pump runs, for example, with the rpm of the internal combustion engine 1. In one possible embodiment, the tension of the belt 9 is adjusted with the aid of the pressure limiting valve 14 which controls the pressure, that is, the secondary pressure, in the output end oil chamber 12. The transmission ratio is adjusted with the aid of a proportional valve (primary valve) 15 at the primary end. The valve 15 can, for example, be configured as a magnetic valve. The secondary pressure is detected by the pressure sensor 22 and is supplied as signal Ps to the control apparatus 20.

In position A, this primary valve 15 can release oil from the drive end oil chamber 11 (primary oil chamber) to the oil tank and thereby reduce the pressure whereby the transmission ratio is shifted to "low". In position C, oil flows into the drive end oil chamber 11 whereby the transmission ratio changes in the direction of overdrive and the pressure in the drive end oil chamber 11 increases. In position B of the proportional valve 15, the valve is closed and the primary oil chamber 11 is sealed tight, that is, virtually no oil can flow out or to oil chamber 11. In this way, the transmission ratio remains, at least essentially, constant. The proportional valve 15 can, for example, be directly controlled or can be driven by a precontrol valve in a manner known per se.

In the embodiment described here, a force is applied to the valve slide by the adjustment of a current I in the magnet 16. A specific position of the proportional valve 15 adjusts because of the spring 17 present on the valve slide. This means that the current I through the magnet 16 determines the position of the proportional valve 15 and therefore the opening cross section of the valve.

Furthermore, a sensor 18 is present for determining the primary rpm Np and a sensor 19 for determining the secondary rpm Ns. The primary and secondary signals Np and Ns are supplied to a control apparatus 20 which adjusts the current I through the magnet 16 of the proportional valve 15.

Furthermore, a sensor 21 is, for example, connected for determining the position α of the accelerator pedal actuable by the driver.

The transmission temperature, that is, the transmission oil temperature, is detected by the temperature sensor 17 and is supplied as signal Tg to the control apparatus 20.

The current I of the primary valve 15 is, inter alia, set to a fixed value, the so-called center point current, when the vehicle is at standstill. The valve 15 then assumes the position B, at least ideally. The transmission ratio is then constant and the transmission ratio controller is in the so-called ratio-hold mode. The center point current, which is to be adjusted, is dependent upon component tolerances and has to be adapted over the service life of the transmission in order to compensate, for example, for deterioration of the spring on the primary valve 15.

In the following embodiments of the invention, possibilities for the adaptation of the center point current are described. As mentioned, component tolerances in the running operation of the vehicle can thereby be compensated. This means that the adjusting complexity in the assembly of the transmission can be reduced. Furthermore, the deterioration of components, especially a setting of the spring 17 on the primary valve 15 is compensated during the running operation.

The shifting speed and the shift direction of the transmission 2 are related directly to the drive current I. For the transmission ratio control, the value of the drive current is the value at which the primary valve holds the transmission ratio constant and is an important parameter. As already mentioned, this parameter is identified as the center point current and influences the extent of the steady-state control deviation. Especially for extremely low vehicle speeds of less than 5 km/h it is not possible to detect the transmission ratio of the CVT transmission 2. In this case, the center point current is adjusted as the drive current I in order to hold the transmission ratio constant.

Figure 2:
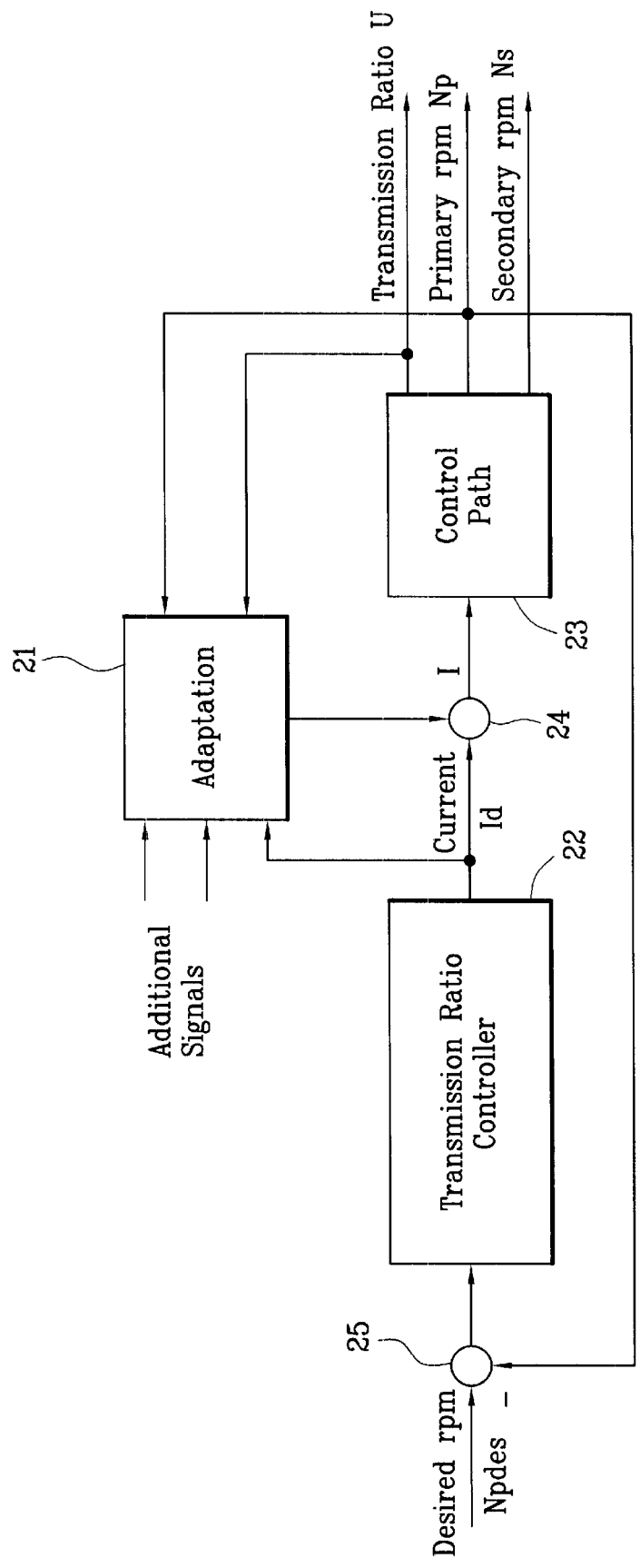
FIG. 2 shows a block circuit diagram of the coupling of the adaptation algorithm according to the invention to the transmission control.

The simplified control loop including the adaptation according to the invention is shown in FIG. 2. The control path 23 comprises the transmission control, the hydraulic control and the CVT transmission. The transmission ratio U of the transmission 2 is set with the drive current I of the primary valve 15. By means of the appropriate sensors, the transmission control senses the primary rpm (Np) and the secondary rpm (Ns) and computes the transmission ratio U of the CVT transmission 2 therefrom. The transmission ratio controller 22 causes the primary rpm Np to follow the desired rpm Np,des (subtraction 25) and computes the required (preliminary) drive current Ia of the primary valve 15. The transmission ratio U, primary rpm Np and (preliminary) drive current Ia go into the adaptation 21 which supplies an offset value for the (preliminary) drive current Ia. At point 24, this offset value is superposed on the (preliminary) drive current Ia to obtain the drive current I actually to be supplied to the valve 15. The offset current, which is to be adapted, is essentially invariable with respect to time.

The transmission ratio controller 22 activates one of three operating modes in dependence upon the operating point of the CVT:

Ratio-hold: The drive current is adjusted to the value of the center point current. In this way, the transmission ratio U remains almost constant. The ratio-hold condition is adjusted for the vehicle at standstill. Furthermore, at low speeds, when the CVT is intended to adjust the start-drive transmission ratio and the actual transmission ratio is closer to the start-drive transmission ratio.

Ratio-low: The drive current is adjusted to a value which effects a slow downshifting. This value can be fixedly selected but need not necessarily be so selected. This operating mode is used when the CVT transmission 2 is intended to be in the start-drive transmission ratio with a slow rolling of the vehicle; however, the actual transmission ratio U is less than a threshold value close to the start-drive transmission ratio.

Control: The drive current is adjusted on the basis of the difference of desired and actual primary rpm (output of the logic position 25).

The center point current is important for the transmission ratio controller 22 especially for the ratio-hold mode so that the transmission ratio U remains constant. If, however, the CVT transmission 2 shifts up in the ratio-hold mode and exceeds a pregivable transmission ratio threshold, then the transmission ratio controller 22 changes into the ratio-low mode in order to again adjust the start-drive transmission ratio.

Figure 3:
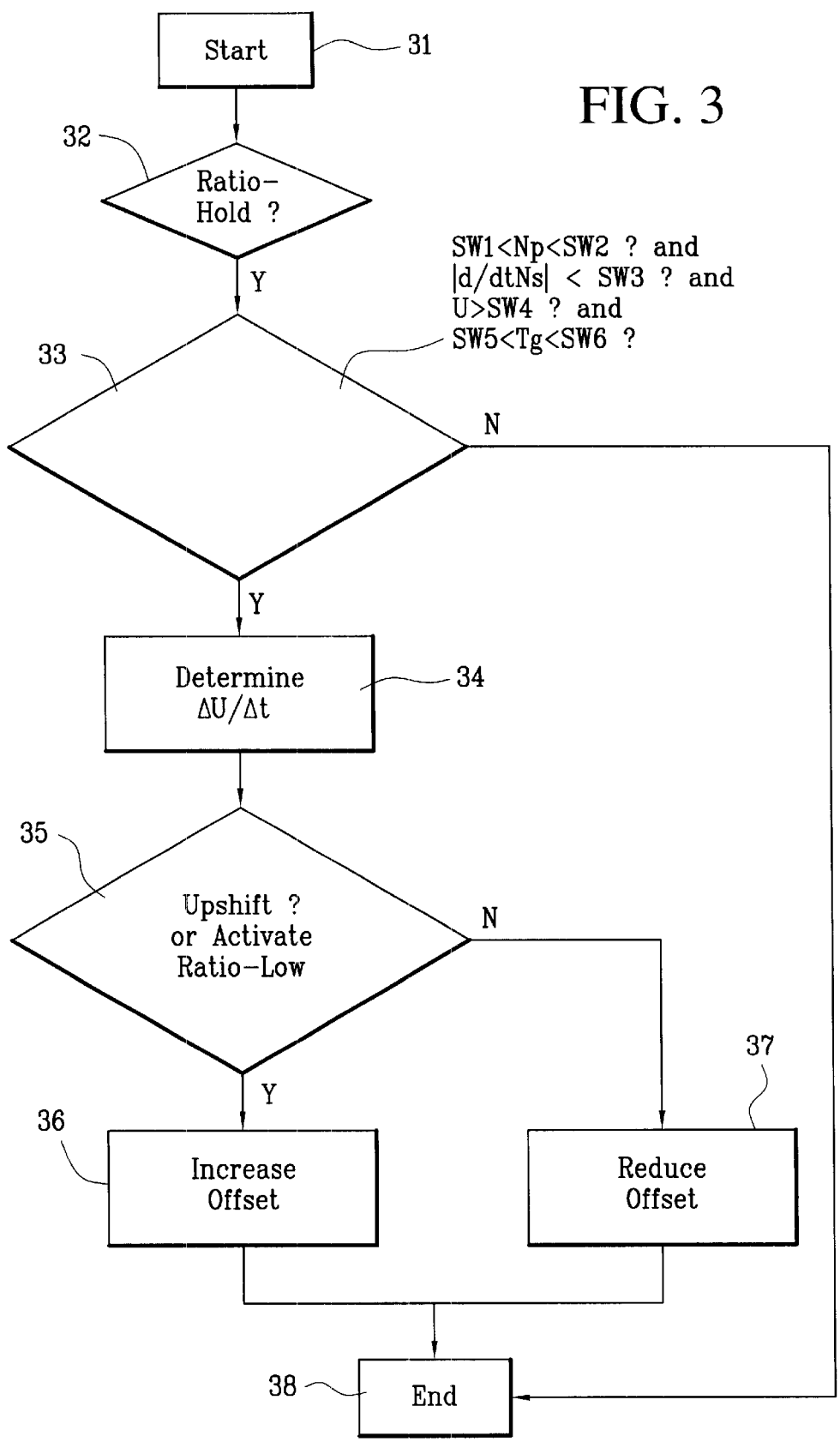
FIGS. 3, 4 and 5 show sequence diagrams of the three variations according to the invention.

The program sequence of the adaptation algorithm is shown in a first variation in FIG. 3.

The adaptation may only take place at operating points which ensure a reliable operation. For this reason, the following conditions are checked before the adaptation is activated. If one of the inquiries described below leads to the result "no", then the program moves directly to the end step 38 and no adaptation in accordance with the first variation is carried out.

The adaptation takes place only in the ratio-hold state, that is, at low speeds and the start-drive transmission ratio, for example, when the vehicle rolls without the accelerator pedal being depressed. For this purpose, and after start step 31, a determination is first made in the inquiry 32 as to whether the ratio-hold mode of operation is currently set. If this is not the case, then the program moves directly to end step 38 and no adaptation is carried out in accordance with the first variation. If this is, however, the case, then the program moves to inquiry step 33. With the third inquiry of step 33, it is ensured that the transmission ratio U is sufficiently high (threshold value SW4).

The adaptation is only used for quasi-steady state driving situations. These driving situations are characterized in that the acceleration is low. For this purpose, and in the second inquiry of step 33, the amount of the secondary rpm gradient dNs/dt, that is, the time-dependent change of the secondary rpm Ns, is compared to an adequately low threshold value SW3.

The adaptation is only carried out when the effect of the change of the adaptation parameter can be observed. For example, the transmission ratio does not change at standstill, that is, no adaptation takes place at standstill. In the first inquiry of step 33, the inquiry is made for this purpose as to whether the primary rpm Np lies in the range between the two threshold values SW1 and SW2.

No adaptation takes place at extremely low or extremely high transmission temperatures Tg. In the last inquiry of step 33, an inquiry is made for this purpose as to whether the temperature Tg lies in the range between the two threshold values SW5 and SW6.

If the preconditions for an adaptation are present, then, in step 34, the direction of the transmission ratio adjustment $\Delta U$ is determined during a fixed time span $\Delta t$ (directional value 0.5 s).

If instead in step 35 it is determined that the transmission 2 has shifted up, then the offset current must be increased in step 36. In this way, the transmission 2 shifts up more slowly.

If it is determined in step 35 that the transmission 2 has downshifted, then the offset current is reduced in step 37. In this way, the transmission can upshift earlier.

If the ratio-low mode of operation is activated by the transmission controller 22 during the waiting time $\Delta t$ (inquiry in step 35), then one can assume that the transmission 2 has shifted up too rapidly. In this case too, the offset current is increased in step 36.

The adaptation operates thereby as a two-point controller which either increases or reduces the offset current by a small amount (standard value, for example, 1 mA). Here, the offset current may, however, be changed only within specific limits.

The driver of the vehicle hardly notices the adaptation because the transmission ratio changes only minimally.

For the first variation, the following can be summarized. According to the invention, an algorithm is introduced which adapts an offset current for the center point current. The adaptation takes place especially for a slowly rolling vehicle at approximately 2 to 8 km/h, for a slight to moderate start drive of the vehicle forwards and for rearward travel. The adaptation is only activated under specific operating conditions and can vary the offset current within specific limits. The adaptation operates then when the transmission ratio control operates in the ratio-hold mode already described. In this mode of operation, the drive current I is always adjusted to the center point current.

The adaptation is blocked when:

the transmission temperature Tg is extremely low or high;

the vehicle acceleration or vehicle deceleration is high;

the transmission input rpm lies outside of specific limits (vehicle is at standstill or vehicle travels relatively fast); and the transmission ratio is not close to the largest transmission ratio (low).

The adaptation algorithm determines the speed of the transmission ratio adjustment. If the transmission 2 shifts down in the ratio-hold mode or if the transmission 2 remains in low within a fixed time span, then the offset current is reduced.

If the transmission shifts up within the time span, then the offset current is increased.

The idea of the described first embodiment comprises that the primary valve 15 is at the center position B when the transmission ratio is constant. However, this does not apply to the operating situation during which a transmission ratio close to overdrive (minimum transmission ratio U) is set or low (maximum transmission ratio U) is set because then the primary valve 15 can be opened entirely in one direction and the transmission ratio U is nonetheless constant. The driving maneuvers which can be considered are, for example, constant travel at speeds from approximately 15 to 60 km/h.

Figure 4:
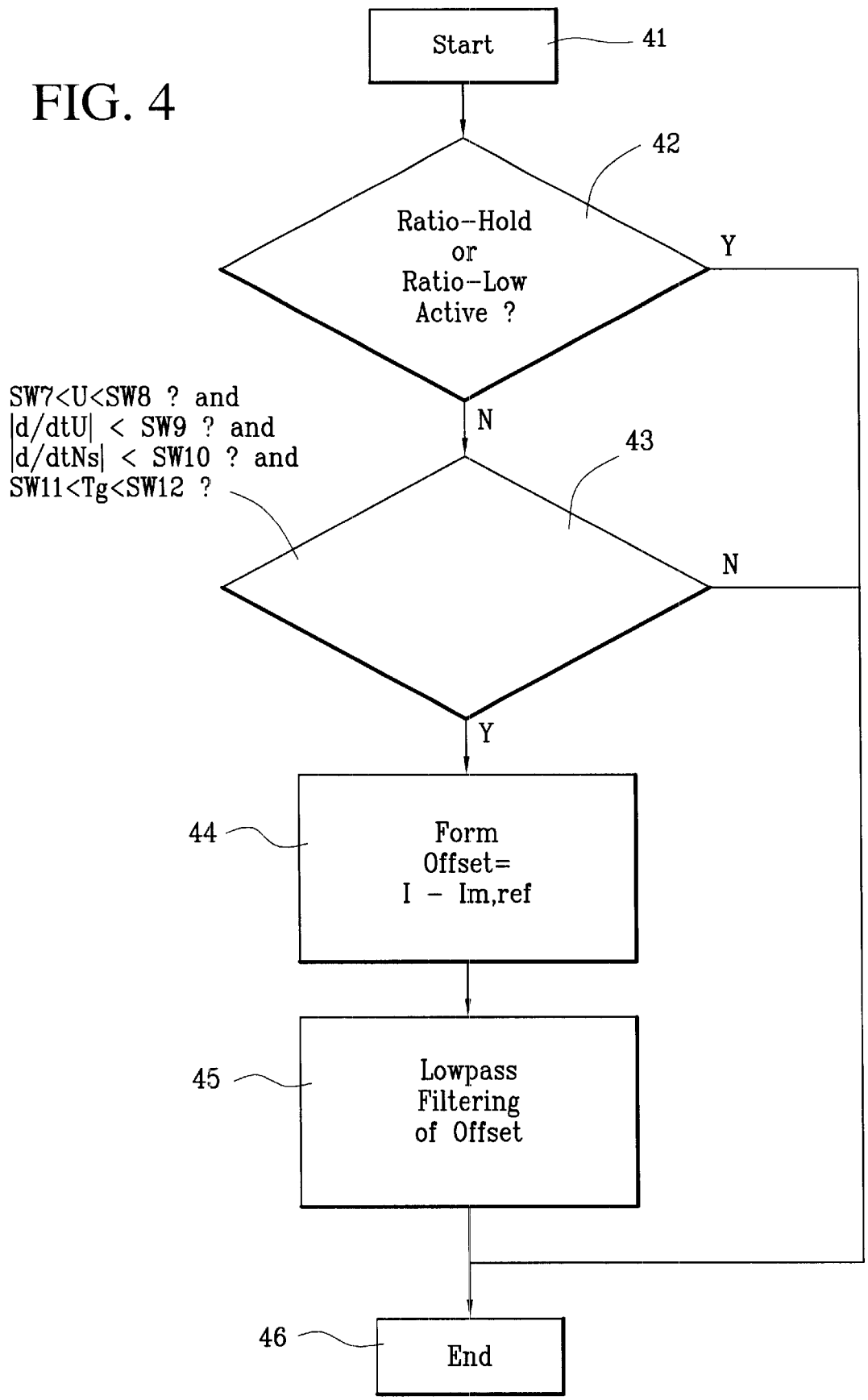

The above is used by the second variation of the adaptation according to the invention which is shown in FIG. 4.

For this purpose, and after start step 41, it is first ensured in the inquiry 42 that the ratio-hold or ratio-low mode is not set. If this mode is set, then the program moves immediately to end step 46 and no adaptation according to the second variation is carried out. If required, the first adaptation variation can be carried out in this case.

If the control mode is set, then, in step 43, different inquiries are made. If one of the inquiries described in the following comes to the result "no", then the program goes directly to the end step 46 and no adaptation in accordance with the second variation is carried out.

With the first inquiry in step 43, a check is made that the transmission ratio U is within the threshold values SW7 and SW8. With this procedure, it is ensured that the transmission ratio U adequately distinguishes from the extreme values (low, overdrive).

Furthermore, a determination is made via the second inquiry as to whether the amount of the transmission ratio gradient dU/dt is adequately low (threshold value SW9) and the transmission ratio therefore does not change significantly.

Likewise, quasi steady-state operating conditions of the transmission should be present. This is inquired in that the amount of the secondary rpm gradient dNs/dt is adequately low (threshold value SW10).

No adaptation takes place at extremely low or high transmission temperatures Tg. In the last inquiry of step 43, an inquiry is made as to whether the temperature Tg lies within the range between the two threshold values SW11 and SW12.

If all inquiries in step 43 are answered with "yes", then the transmission ratio controller controls the transmission ratio U via the instantaneous drive current I essentially to a constant value. The valve 15 therefore has to be disposed at the center position B. In step 44, the value offset is formed as the difference between the instantaneous drive current I and the stored reference center point current Im,ref.

In step 45, the offset value is further filtered by a lowpass.

The idea of the third variation (FIG. 5) is comprised in that a primary pressure sensor (not shown in FIG. 1) is present or the primary pressure Pp can be computed from other quantities, for example, secondary pressure sensor signal and the drive currents of the primary and secondary valves. The center position of the primary valve is so adjusted that a specific primary pressure adjusts.

Figure 5:
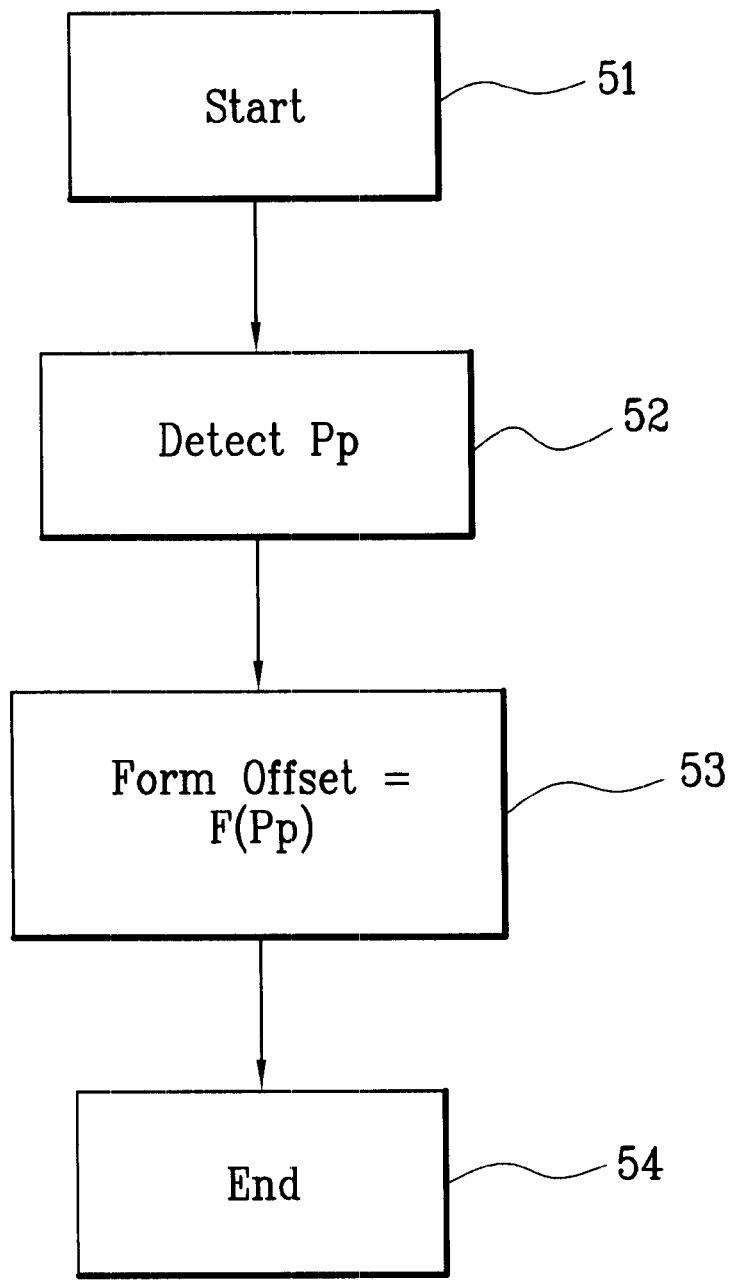

For this purpose, in FIG. 5, after the start step 51, the primary current Pp is first detected in step 52. In step 53, the offset value is then formed as a function F of the primary pressure Pp whereupon the program moves to end step 54.

What is claimed is:

1. A system for hydraulically adjusting a transmission ratio of a continuously variable transmission of a vehicle, the system comprising:

means for adjusting the transmission ratio via a drive of at least one valve via an electrical signal (I);

means for holding the transmission ratio essentially constant in an operating state of the transmission by setting the electric signal (I) to a pregivable value; and, means for changing said pregivable value in normal operation of the vehicle.

2. The system of claim 1, wherein the change of the pregivable value takes place in dependence upon an adaptation wherein the adaptation is carried out when pregivable operating conditions are present.

3. The system of claim 2, wherein at least one of the pregivable operating conditions is present when the transmission is in an operating state wherein the transmission ratio of the transmission is constant and does not change as a function of time.

4. The system of claim 3, wherein the pregivable value is changed in dependence upon the electrical signal (I) which is adjusted with the presence of the pregivable operating conditions.

5. The system of claim 1, wherein a pressure is controlled via the drive of the valve and a pressure value is detected, which represents the pressure in the operating state of the transmission and the pregivable value can be changed in dependence upon the pressure value which is detected.

6. A system for hydraulically adjusting a transmission ratio of a continuously variable transmission of a vehicle, the system comprising:

means for adjusting the transmission ratio via a drive of at least one valve via an electrical signal (I);

means for holding the transmission ratio essentially constant in an operating state of the transmission by setting the electric signal (I) to a pregivable value;

means for changing said pregivable value in normal operation of the vehicle; and, said pregivable value including a base value and an offset value and the offset value can be changed wherein it is provided that the offset value is considered in the formation of the electric signal (I).

7. A system for hydraulically adjusting a transmission ratio of a continuously variable transmission of a vehicle, the system comprising:

means for adjusting the transmission ratio via a drive of at least one valve via an electrical signal (I);

means for holding the transmission ratio essentially constant in an operating state of the transmission by setting the electric signal (I) to a pregivable value;

means for changing said pregivable value in normal operation of the vehicle;

the change of the pregivable value taking place in dependence upon an adaptation wherein the adaptation is carried out when pregivable operating conditions are present;

said pregivable value being changed when a change of the transmission ratio is detected when the pregivable operating conditions are present; and, the pregivable value being changed so that the change of the transmission ratio is countered.

8. A system for hydraulically adjusting a transmission ratio of a continuously variable transmission of a vehicle, the system comprising:

means for adjusting the transmission ratio via a drive of at least one valve via an electrical signal (I);

means for holding the transmission ratio essentially constant in an operating state of the transmission by setting the electric signal (I) to a pregivable value;

means for changing said pregivable value in normal operation of the vehicle;

the change of the pregivable value taking place in dependence upon an adaptation wherein the adaptation is carried out when pregivable operating conditions are present; and, at least one of the pregivable operating conditions is present when the transmission is in an operating state wherein the transmission ratio is held constant by setting the electric signal (I) to the pregivable value.

9. The system of claim 8, wherein said vehicle has a longitudinal speed and further ones of the pregivable operating conditions are present:

when quasi steady-state operating conditions of the transmission are present; or, when the vehicle longitudinal speed is within a pregivable range; or, when the temperature of the transmission lies within a pregivable range; or, when the transmission ratio of the transmission is within a pregivable range.

10. A system for hydraulically adjusting a transmission ratio of a continuously variable transmission of a vehicle, the system comprising:

means for adjusting the transmission ratio via a drive of at least one valve via an electrical signal (I);

means for holding the transmission ratio essentially constant in an operating state of the transmission by setting the electric signal (I) to a pregivable value;

means for changing said pregivable value in normal operation of the vehicle;

the change of the pregivable value taking place in dependence upon an adaptation wherein the adaptation is carried out when pregivable operating conditions are present;

at least one of the pregivable operating conditions being present when the transmission is in an operating state wherein the transmission ratio of the transmission is constant and does not change as a function of time;

additional ones of the pregivable operating conditions are present:

when the transmission ratio of the transmission is within a pregivable range; or, when the time-dependent change of the transmission ratio of the transmission is within a pregivable range; or, when quasi steady-state operating conditions of the transmission are present; or, when the temperature of the transmission is within a pregivable range.

11. A system for hydraulically adjusting a transmission ratio of a continuously variable transmission of a vehicle, the system comprising:

means for adjusting the transmission ratio via a drive of at least one valve via an electrical signal (I);

means for holding the transmission ratio essentially constant in an operating state of the transmission by setting the electric signal (I) to a pregivable value;

means for changing said pregivable value in normal operation of the vehicle;

the change of the pregivable value taking place in dependence upon an adaptation wherein the adaptation is carried out when pregivable operating conditions are present; and, the electrical signal (I) is adjusted during the adaptation so that the adjustment of the transmission ratio to higher transmission ratios is undertaken wherein it is provided that the electrical signal, which is adjusted during the adaptation, is less by a difference ($\Delta I$) than the electrical signal (I) adjusted ahead of the adaptation.

12. A system for hydraulically adjusting a transmission ratio of a continuously variable transmission of a vehicle, the system comprising:

a valve connected to said continuously variable transmission through which hydraulic fluid can pass;

means for adjusting the transmission ratio via a drive of at least one valve via an electrical signal (I);

means for holding the transmission ratio essentially constant in an operating state of the transmission by setting the electric signal (I) to a pregivable value; and, means for changing said pregivable value in normal operation of the vehicle to compensate for a deterioration of said valve.

* * * * *